(12) United States Patent
Latapie et al.

(10) Patent No.: US 10,635,704 B2
(45) Date of Patent: Apr. 28, 2020

(54) AUTOMATIC ONTOLOGY GENERATION FOR INTERNET OF THINGS APPLICATIONS

(71) Applicant: Cisco Technology, Inc., San Jose, CA (US)

(72) Inventors: Hugo Latapie, Long Beach, CA (US); Enzo Fenoglio, Issy-les-Moulineaux (FR); Andre Surcouf, Saint-Leu-la-Foret (FR); Joseph T. Friel, Ardmore, PA (US); Pete Rai, Egham (GB)

(73) Assignee: Cisco Technology, Inc., San Jose, CA (US)

( * ) Notice: Subject to any disclaimer, the term of this patent is extended or adjusted under 35 U.S.C. 154(b) by 743 days.

(21) Appl. No.: 15/212,097

(22) Filed: Jul. 15, 2016

(65) Prior Publication Data
US 2018/0018393 A1    Jan. 18, 2018

(51) Int. Cl.
| | |
|---|---|
| *G06F 16/00* | (2019.01) |
| *G06F 16/36* | (2019.01) |
| *H04L 12/24* | (2006.01) |
| *G06F 16/33* | (2019.01) |
| *G06F 16/9535* | (2019.01) |

(52) U.S. Cl.
CPC ........ *G06F 16/367* (2019.01); *G06F 16/3344* (2019.01); *G06F 16/3346* (2019.01); *G06F 16/9535* (2019.01); *H04L 41/12* (2013.01); *H04L 41/145* (2013.01); *H04L 41/16* (2013.01)

(58) Field of Classification Search
CPC .................................................. G06F 16/367

USPC .......................................................... 707/794
See application file for complete search history.

(56) References Cited

U.S. PATENT DOCUMENTS

| | | | |
|---|---|---|---|
| 10,116,513 B1* | 10/2018 | Sundaram ............. | G06F 16/245 |
| 2008/0307523 A1* | 12/2008 | Subramanyam ...... | G06F 16/367 |
| | | | 726/21 |
| 2010/0077078 A1* | 3/2010 | Suit ....................... | G06F 21/566 |
| | | | 709/224 |
| 2014/0330929 A1 | 11/2014 | Dong et al. | |
| 2015/0341379 A1* | 11/2015 | Lefebvre ............. | H04L 63/1425 |
| | | | 726/22 |
| 2016/0006815 A1 | 1/2016 | Dong et al. | |

(Continued)

OTHER PUBLICATIONS

An ontology for the automated deployment of applications in heterogeneous IoT environments; By: Konstantinos Kotis, Published 2012 http://www.semantic-web-journal.net/sites/default/files/swj247_0.pdf.*

(Continued)

*Primary Examiner* — Chelcie L Daye
(74) *Attorney, Agent, or Firm* — Behmke Innovation Group LLC; James M. Behmke; Jonathon P. Western

(57) ABSTRACT

A method comprises collecting, by a computing device located at an edge of a network, data items corresponding to information transmitted by endpoints using the network, generating, by the computing device, a probabilistic hierarchy using the data items, generating, by the computing device using the probabilistic hierarchy and natural language data, a similarity metric, generating, by the computing device using the probabilistic hierarchy, the natural language data, and the similarity metric, an ontology, detecting, by the computing device using the ontology, an anomaly, and in response to detecting the anomaly, sending a notification.

20 Claims, 5 Drawing Sheets

(56) References Cited

U.S. PATENT DOCUMENTS

2016/0019294 A1 1/2016 Dong et al.
2016/0162456 A1* 6/2016 Munro .................. G06F 3/0482
704/9

OTHER PUBLICATIONS

"An ontology for the automated deployment of applications in heterogeneous IoT environments"; By: Konstantinos Kotis, Published 2012 https://s3.amazonaws.com/academia.edu.documents/37043198/swj247_0.pdf?response-content-disposition=inline%3B%20filename%3DAn_ontology_for_the_automated_deployment.pdf&X-Amz-Algorithm.*

"Automatic Ontology Generation: State of the Art"; by: Iven Bedini, Published 2007 http://bivan.free.fr/Janus/Docs/Automatic_Ontology_Generation_State_of_Art.pdf.*

Zhuge, Hai, "Mapping Big Data into Knowledge Space with Cognitive Cyber-Infrastructure," pp. 01-59; http://arxiv.org/; Webpage Accessed on Feb. 1, 2016. 59 pages.

Xu et al. "An Upper-Ontology-Based Approach for Automatic Construction of IOT Ontology,", International Journal of Distributed Sensor Networks, vol. 2014, Apr. 3, 2014.

Tho, Quan Thanh, et al. "Automatic fuzzy ontology generation for semantic web." Knowledge and Data Engineering, IEEE Transactions on 18.6 (2006): 842-856.

Li et al., "Computational Approach for Identifying and Visualizing Innovation in Patent Networks,", dated Aug. 2013, 172 pages.

Bedini, Ivan, and Nguyen, Benjamin. "Automatic ontology generation: State of the art." PRiSM Laboratory Technical Report. University of Versailles (2007).

* cited by examiner

AUTOMATIC ONTOLOGY GENERATION FOR INTERNET OF THINGS APPLICATIONS

TECHNICAL FIELD

The present disclosure is in the technical field of computer-implemented methods, computer software and/or computer hardware for generating ontologies that represent the physical and logical attributes of digital devices that can be connected to the internet. The disclosure also is in the technical field of computer-implemented techniques for automatic generation of ontologies for internet-of-things (IoT) devices without human authoring.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet of Things (IoT) refers to an environment of sensors, monitors, and other devices, typically different from traditional desktop, laptop and server computers, which are capable of connecting to the public internet or to other packet-based networks. As the IoT expands, and more and more devices are connected, the number of endpoints will reach well into the billions. Managing these endpoints will be a complex task and there is a particular need to find ways for these devices to be managed, configured and operated upon in a seamless manner with the least amount of device-specific work by computers.

One management task that will be unable to be performed manually, due to time constraints, is generating an ontology that categorizes, classifies or maps the capabilities, constraints, relationships, context and functionality of large numbers of diverse devices. An example might be an office building that contains thousands of sensors and actuators for monitoring HVAC systems, security or other physical operations; for all these devices to be easily usable by automated systems, they need to be organized into a meaningful logical hierarchy that addresses both function and location. An ontology is a categorization plan that organizes the properties, types, relationships, and other aspects of an entity. In the past, developing formal ontologies through computer programming has been tedious and time-consuming because each ontology must capture a large amount of domain-specific knowledge that may be only mentally known. Typically this required domain experts to spend a great deal of time with bespoke tools. Methods are needed to automatically generate ontologies for a network of many different types of devices with different classes and capabilities.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. OVERVIEW
2. EXAMPLE SYSTEM IMPLEMENTATION
3. FIRST FUNCTIONAL EXAMPLE
4. SECOND FUNCTIONAL EXAMPLE
5. IMPLEMENTATION EXAMPLE
6. HARDWARE OVERVIEW

1. Overview

Computer-implemented techniques are provided for automatically generating ontologies. In one embodiment, the ontologies are generated based on data that is flowing through a network. The data may be used to generate probabilistic models, which are then linked to linguistic data to generate the ontologies. Thus, the ontologies are generated using multi-modal data that, when combined, results in a stronger more robust ontology than previously available. This process may be performed, in part, at the edge of the network so that less traffic needs to flow to the backend.

In one embodiment a computing device located at an edge of a network is configured to perform: collecting a plurality of data items corresponding to information transmitted by a plurality of endpoints using the network; generating, by the computing device, a probabilistic hierarchy using the plurality of data items; generating, by the computing device using the probabilistic hierarchy and natural language data, a similarity metric; generating, by the computing device using the probabilistic hierarchy, the natural language data, and the similarity metric, an ontology; detecting, by the computing device using the ontology, an anomaly; in response to detecting the anomaly, sending a notification.

Other aspects, features and embodiments will become apparent from the disclosure as a whole.

2. Example System Implementation

Figure 1:
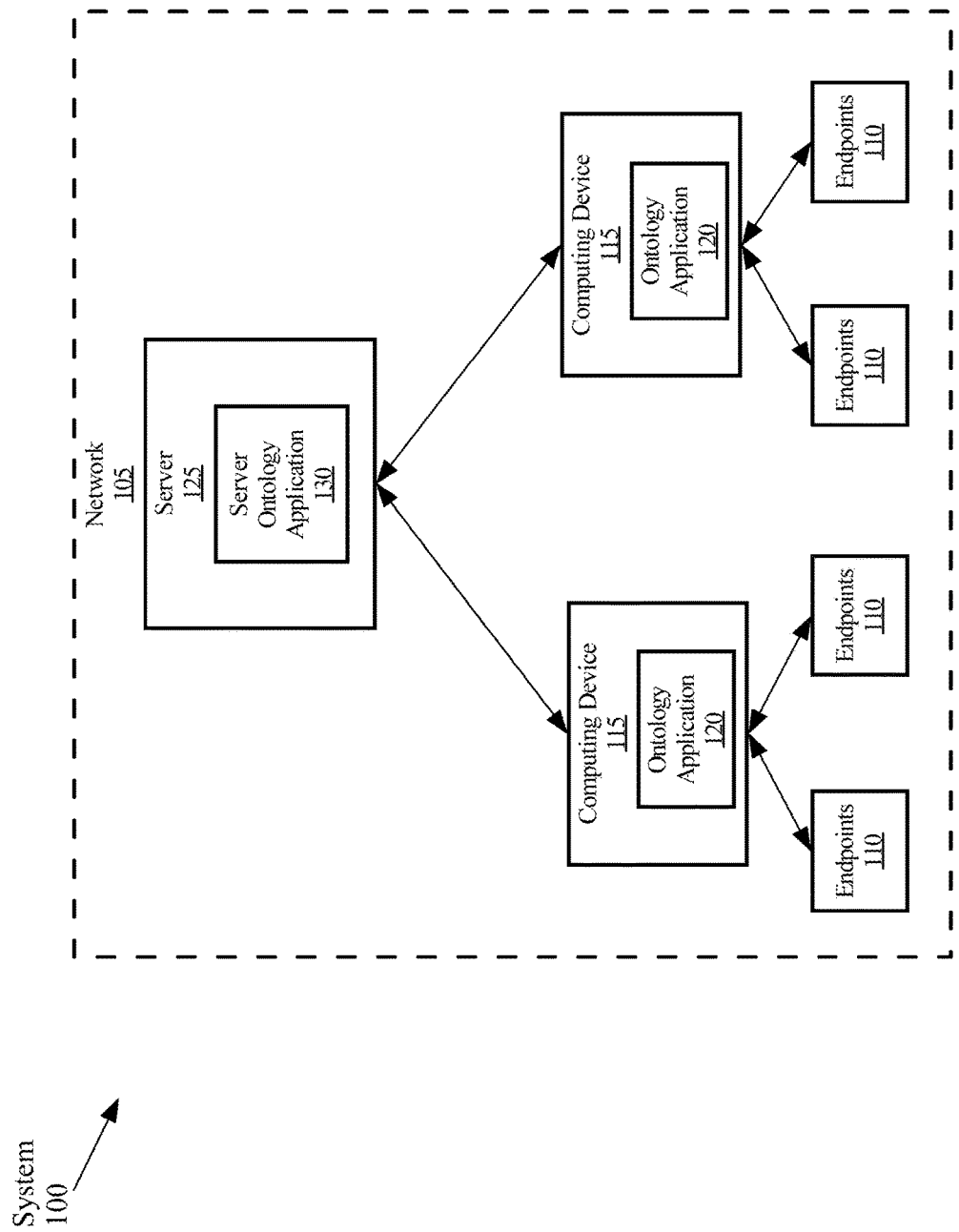
FIG. 1 shows a block diagram of a networked computer system in accordance with an embodiment.

FIG. 1 illustrates an example system in which the techniques described may be practiced, according to some embodiments. In one embodiment, system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

In an embodiment, network 105 may be any kind of computer network using any combination of wired and/or wireless communication, including, but not limited to: a Local Area Network (LAN), a Wide Area Network (WAN), the Internet, a company network, etc. Although a single network 105 is depicted in FIG. 1, any number of networks 105 may be present. Generally, network 105 allows devices (such as endpoints 110, computing device 115, server 125, etc.) to communicate with other devices connected to the network. The communication may include any type and/or amount of data, and may be communicated using any format or standard. Some examples of transport protocols include, but are not limited to: Transmission Control Protocol (TCP) and User Datagram Protocol (UDP). The information sent over network 105 takes the form of packets. Packets may be of any size, and may contain any type or kind of data in any suitable format. In one embodiment, the information sent over network 105 is encrypted. Alternatively, the information sent over network 105 may not be encrypted, or may be some combination of encrypted and unencrypted. Specifically, network 105 may correspond to a particular domain, location, system, or other context, such as a smart building, smart factory, smart house, or other context with many different connected devices.

In an embodiment, endpoints 110 may be any device able to connect to network 105. Although FIG. 1 shows four endpoints 110, there may be any number of endpoints within a given domain or context. Specifically, endpoints 110 may be IoT devices including, but not limited to: temperature sensors, motion detectors, thermostats, telephones, conferencing systems, video cameras, infrared cameras, speakers, microphones, lights, appliances/electronics (such as a fridge, toaster, watercooler, water filter, fax machine, copier, scanner, etc.), laptop computers, and desktop computers. Endpoints 110 may be stationary, and have an associated fixed position. Alternatively, endpoints 110 may be mobile, or may vary based on the type of endpoint. Endpoints 110 send information to other devices using network 105, such as other endpoints 110, computing device 115, server 125, or any other suitable device. The information sent by endpoints 110 has a format, although the format may not initially be known to ontology application 120, for example. Some information sent by endpoints 110 (such as metadata, header information, packet size, and inter-packet arrival time) may be able to be collected by computing device 115, as discussed below.

In an embodiment, computing device 115 is any computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, minicomputers, servers, racks, routers, switches, other network infrastructure devices, and the like. Computing device 115 is located at the edge of network 105, enabling computing device 115 to perform processing on data nearby or at the source of the data, instead of sending the data to a backend device for processing. Computing device 115 is communicatively connected to network 105. Although two computing devices 115 are shown in FIG. 1, any number of computing devices may be located within a particular context or network. Specifically, computing device 115 may be a network infrastructure device such as a router, switch, access point, etc. Computing device 115 may include applications, software, and/or other executable instructions to facilitate various aspects of embodiments described herein. Specifically, computing device 115 includes ontology application 120.

In an embodiment, ontology application 120 is a software application that executes on computing device 115. Ontology application 120 comprises program instructions that are programmed or configured to collect data corresponding to information transmitted by endpoints 110. The data may be collected in any manner, such as through packet sniffing or otherwise gleaning data from packets that pass by or through computing device 115. The data may even be specifically sent to the ontology generated for the directed purpose of creating its output. Specifically, the type of data that may be collected includes, but is not limited to: metadata, header data, inter-packet arrival time, packet size, and the payload itself. The data may be collected whether or not the packets are encrypted. Further, the data may be collected over any period of time.

In an embodiment, ontology application 120 comprises program instructions that are programmed or configured to generate a probabilistic hierarchy based on the data. The probabilistic hierarchy may be generated using any method now known or later developed. For example, simple frequency counting, or more complex log-likelihood, further still clustering, or even deep Boltzmann machines, and/or restricted Boltzmann machines may be used. In an embodiment, ontology application 120 comprises program instructions that are programmed or configured to receive natural language data. The natural language data may take any suitable form such as WordNet. WordNet is a lexical database for the English language. Other sources of natural language data may also be used, in any natural language. Additionally, other semantic data may optionally be received in addition to natural language data, such as a resource description framework (RDF), XML tags, JSON tags, HTML5 tags, or a floorplan layout, etc.

In an embodiment, ontology application 120 comprises program instructions that are programmed or configured to generate a similarity metric using the probabilistic hierarchy and the natural language data, and to generate an ontology. The similarity metric may be based, for example, on a Kolmogorov complexity, Jensen-Shannon divergence, Fisher information metric or any other method. The similarity metric indicates how closely related elements of the probabilistic hierarchy are to words from the natural language data, and is used for generating the ontology. The ontology links the empirical data collected by the system to the natural language data elements, and provides eventual human users with a clear description of the domain or context. The generated ontology naturally disambiguates similar items/terms because the ontology is linked to the probabilistic hierarchy. In the probabilistic hierarchy, there is no confusion—every endpoint or other data item identified by the probabilistic hierarchy is based on actual data that was transmitted through network 105, and therefore is uniquely identifiable by some aspect(s), such as location, URI, URL, Internet Protocol (IP) address, type of endpoint, type of data transmitted, primary usage, etc.

During generation of the ontology, multiple related endpoints may be identified and fused, and data from the group of fused endpoints may then be treated holistically. For example, if the data indicates that a group of 15 endpoints belong to a single room, those 15 endpoints may be fused, enabling them to be treated as a group of related endpoints.

Additionally, the ontology may label endpoints in any suitable manner. For example, if a group of endpoints has been identified as belonging to a single room, and the IP traffic from that room is predominately related to a video conferencing application, the ontology may label the room as "Video Conferencing Room." Even further detail is possible if, for example, the video conferencing room is primarily used by individuals from a specified team within a company, then the label may be "Team A Video Conferencing Room." This grouping can yield useful entity-property relationships as well as identify significant words within the problem domain.

In an embodiment, ontology application 120 comprises program instructions that are programmed or configured to detect anomalies and send notifications. The anomalies are detected using the ontology that ontology application 120 created. Thus, the anomalies are detected based on real observed data and expected values of that data going forward. Anomalies may occur when, for example, a temperature sensor suddenly reports temperatures far above or below expected values. In response, ontology application 120 may send an alert to any suitable entity, such as an administrator of the system and/or server 125.

In an embodiment, ontology application 120 comprises program instructions that are programmed or configured to generate simulated output for verification. To verify that the ontology is correct, ontology application 120 uses a recent sample of data from an endpoint and, using the probabilistic hierarchy, generates an expected output in response to the recent sample of data. If the expected output is not within an accuracy threshold or holds previous encountered enumerate values, the probabilistic hierarchy and the ontology need to be updated to improve their accuracy. If the expected output is within the accuracy threshold, then the ontology is deemed accurate enough and updates are not necessary.

In an embodiment, ontology application 120 comprises program instructions that are programmed or configured to send the ontology to server 125. Because each computing device 115 may be located near the edge of network 105, a given ontology application only sees a portion of the overall traffic on network 105. Thus, once ontology application 120 generates an ontology, the ontology is sent to server 125 to be combined with other ontologies from other computing devices at other locations on network 105. Optionally, the probabilistic hierarchy or other generated information may also be sent to server 125 in any suitable manner. When sending the ontology or other information to server 125, the ontology or other information may be compressed to further reduce the amount of network traffic that the sending creates and without changing the similarity relationships within the ontology. Additionally, ontology application 120 may receive updates to the ontology from server 125 in any suitable manner or format.

In an embodiment, server 125 may be any server, rack, computer, or other backend computing device. Server 125 is not located at the edge of network 105. Rather, server 125 may be located at a more centralized location, or any other suitable locale. Server 125 is communicatively connected with computing devices 115, and executes server ontology application 130.

In an embodiment, server ontology application 130 may have any of the program instructions that are programmed or configured as discussed above with regards to ontology application 120. Server ontology application 130 may also have additional program instructions that are programmed or configured to perform other actions, such as receiving and combining ontologies and sending updates to computing devices. Server ontology application 130 may receive ontologies from computing devices in any manner. The received ontologies are "partial" in the sense that each individual ontology represents a small portion of the overall network. By combining received ontologies, server ontology application is able to create a complete ontology representing network 105. In combining ontologies, server ontology application 130 may determine that portions of a particular ontology are incorrect or incompatible. In response, server ontology application 130 sends an update to the computing device associated with the particular ontology, so that the computing device is able to correct and update the incorrect portion of the ontology. However, an incomplete partial ontology may be sufficient for a process that is performing only limited functionality.

3. First Functional Example

Figure 2:
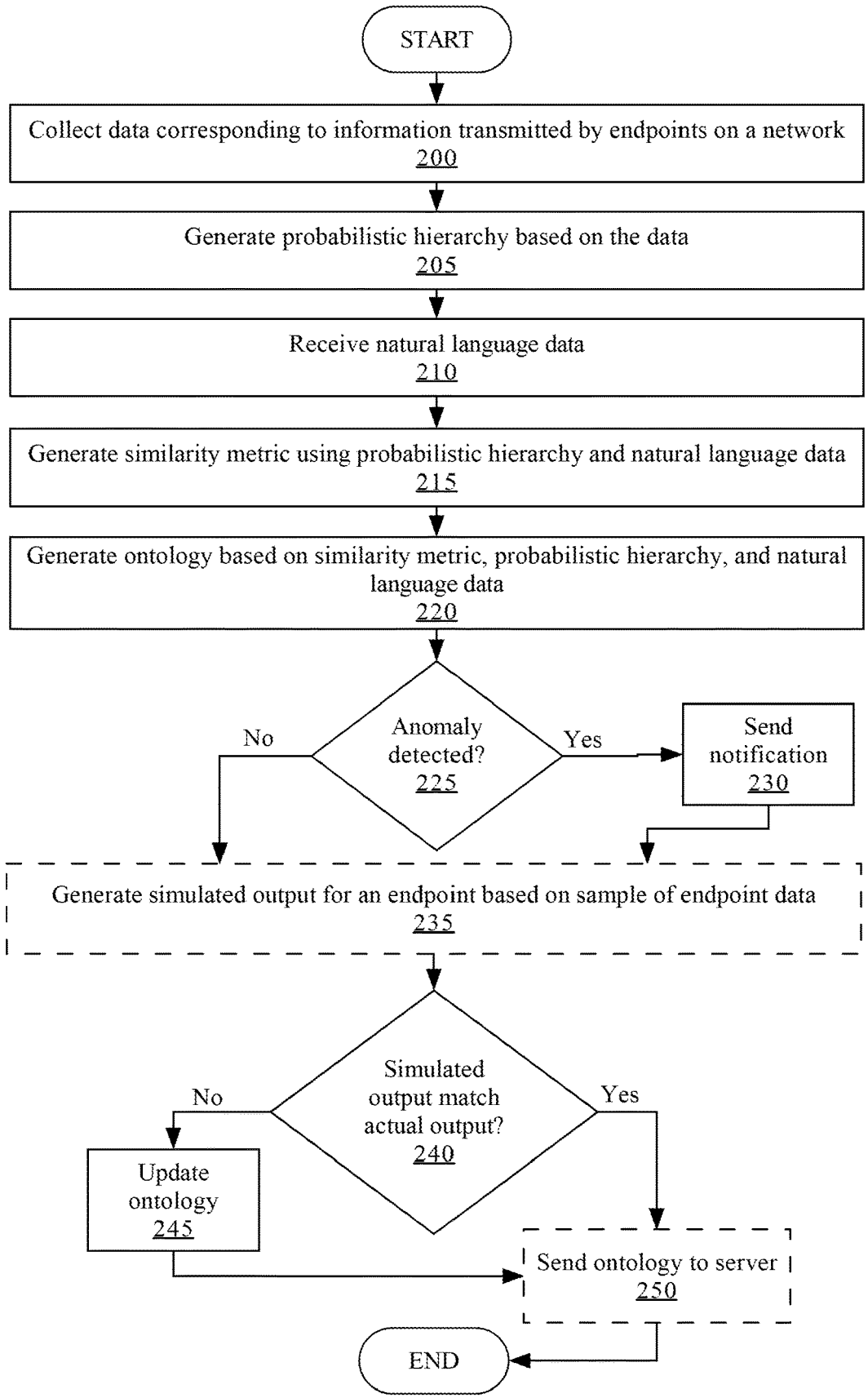
FIG. 2 illustrates an example algorithm for a computer-implemented method of automatically generating an ontology for endpoints of a network, in one embodiment.

FIG. 2 illustrates an example algorithm for a computer-implemented method of automatically generating an ontology for endpoints of a network, in one embodiment. FIG. 2 shows an example flowchart for generating an ontology based on actual data from the domain or context. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of FIG. 2, FIG. 3 and each other flow diagram that are illustrated and described herein are intended to indicate operations that are performed using programming in a special-purpose computer or general-purpose computer, in various embodiments, at the level of skill in the art to which persons in this field are accustomed to communicating. In other words, each flow diagram in this disclosure is a guide, plan or specification of an algorithm for programming a computer to execute the functions that are described, and is expressed at a level of detail that is believed to be typical for those at the high level of skill to which the disclosure is directed.

In step 200, the process collects data that corresponds to information transmitted by endpoints on a network. The data may be collected using packet sniffing of packets passing through a router that are identified with a particular range of IP addresses, or particular protocols, that are known to be associated with the endpoints; by issuing SNMP GET requests to packet routers that are connected to the endpoints to request values that have been obtained from endpoint traffic as it passes through the routers; or by active polling of devices. Optionally, data may be sent for the express intention of indexing the contents for ontology generation. Example data that may be collected includes, but is not limited to: metadata such as location, time, or type of device, header data such as protocol value, packet size, inter-packet arrival time and the payload. If packet payload information transmitted by the endpoints is encrypted, then unencrypted header data may be collected to create protocol fingerprinting as an efficient and compact way to represent the behavior of the protocol. Because the collected data is based on actual information transmitted through a network, the models built from this data reflect the particular domain and the network as the network or domain actually exists and is used. Additionally, the data is collected at the edge of the network and some of the processing is also performed at the edge of the network, thereby reducing the overall traffic on the network.

In step 205, a probabilistic hierarchy is generated based on the data. In one embodiment, a deep Boltzmann machine composed of a plurality of restricted Boltzmann machines may be used; other embodiments may use other forms of neural networks or machine learning algorithms. Boltzmann machines (BM) are a network of symmetrically coupled stochastic binary units capable of learning the internal representation. Restricted Boltzmann machines (RBM) do not allow interlayer connection between hidden units, but can be stacked and trained in a greedy manner to form a Deep Belief Network (DBN). Generally, any neural network or machine learning algorithms may be used provided that the reconstruction error for autoencoders used by the neural network or machine learning algorithm(s) is low. The neural network or machine learning algorithms may have any number of layers, although at least 8 to 10 layers or more is usually preferable.

In step 210, natural language data is received. In one embodiment, receiving the natural language data comprises programmatically reading a stored configuration file that lists natural language terms that are relevant to the particular IoT context in which the method is performed. For example, if the method is used to process IoT elements relating to smart buildings, then the natural language file may list terms such as thermostat, air conditioner, furnace, alarm, alarm sensor, and so forth. Receiving such data also may comprise forming and dispatching a parameterized Web Services call to a web server that is coupled to a database and receiving an HTTP response with an XML or JSON payload that contains a vocabulary list. The specific means by which the natural language is received, and the format of the natural language data, are not critical. Additional information with limited natural language elements may also be received in step 210, such as an RDF, floorplan, or any other available information that may improve the ontology.

In step 215, a similarity metric is generated using the probabilistic hierarchy and natural language data. The similarity metric comprises a numeric representation of a level of similarity of the hierarchy as compared to the natural language data, and therefore reflects a level of accuracy in generating the hierarchy. By linking the probabilistic hierarchy and natural language data with a good degree of similarity as reflected in the similarity metric, a human readable automatically generated ontology is made possible. In one embodiment, the similarity metric is a similarity measure based on Kolmogorov complexity, but other similarity metrics like Jensen-Shannon divergence or Fisher information metric can be used.

In step 220, an ontology is generated based on the similarity metric, the probabilistic hierarchy, and the natural language data. The ontology is generated without human input. The ontology naturally disambiguates individual endpoints or other elements of the ontology because of the ontology's basis in the probabilistic hierarchy, where each element is well defined and not ambiguous. Like earlier steps, the ontology is generated at the edge of the network, and represents a small portion of the overall network. Since the ontology is generated based on a similarity metric, the probabilistic hierarchy and the natural language data that are all but different facets of the same manifold structure underneath they can be associated to provide a joint similarity metric and create a more powerful representation of the manifold combining each contributions into a fusion multi-kernel support. In one embodiment, a variant of the Fisher information metric and natural gradient descent methods may be used to generate the ontology, although other methods may be used.

In step 225, a determination is made whether an anomaly has been detected. In this context, an anomaly refers to data or information that is outside of an expected range or values. The determination is made based on the generated ontology and expected values for the relevant data without the need to know what distribution anomalies belong to. If there is no anomaly detected, the method proceeds to step 235. If there is an anomaly detected, the method proceeds to step 230. Although shown at a specific location in FIG. 2, step 225 may be performed at any time once an ontology has been generated.

In step 230, a notification is sent. The notification may be sent in any format, and may be sent to any suitable entity, such as a security officer, administrator, server, etc.

In step 235, simulated output is generated for an endpoint based on sample endpoint data. As indicated by the dotted lines, step 235 is optional and may be performed at any time. The simulated output is generated using at least the probabilistic hierarchy and the sample endpoint data. Thus, the simulated output represents what the system believes an endpoint would do, given the sample data, and is an effective way to determine how accurate the ontology is.

In step 240, a determination is made whether the simulated output matches actual output. The simulated output does not need to match the actual output exactly. Rather, the simulated output should be within an error threshold of the actual output. For example, if the error threshold is set to 90% accuracy, the simulated output would need to be within 90% of the actual output. Thus, if an actual value is 100, a simulated output of 90 is acceptable, while a simulated output of 80 is not. If the simulated output matches the actual output, the method proceeds to step 250. If the simulated output does not match the actual output, the method proceeds to step 245.

In step 245, the ontology is updated. The ontology may be updated in any manner. The ontology may also be updated in response to other actions/steps. For example, although not shown in FIG. 2, the backend server may send an update to the ontology of a specific computing device. In response, the ontology is updated.

In step 250, the ontology is sent to the server. As indicated by the dotted lines, step 250 may be performed at any time. The ontology may be sent to the server in any manner. Prior to sending, the ontology may be compressed. Additionally, other data may also be sent to the server, such as the probabilistic hierarchy.

4. Second Functional Example

Figure 3:
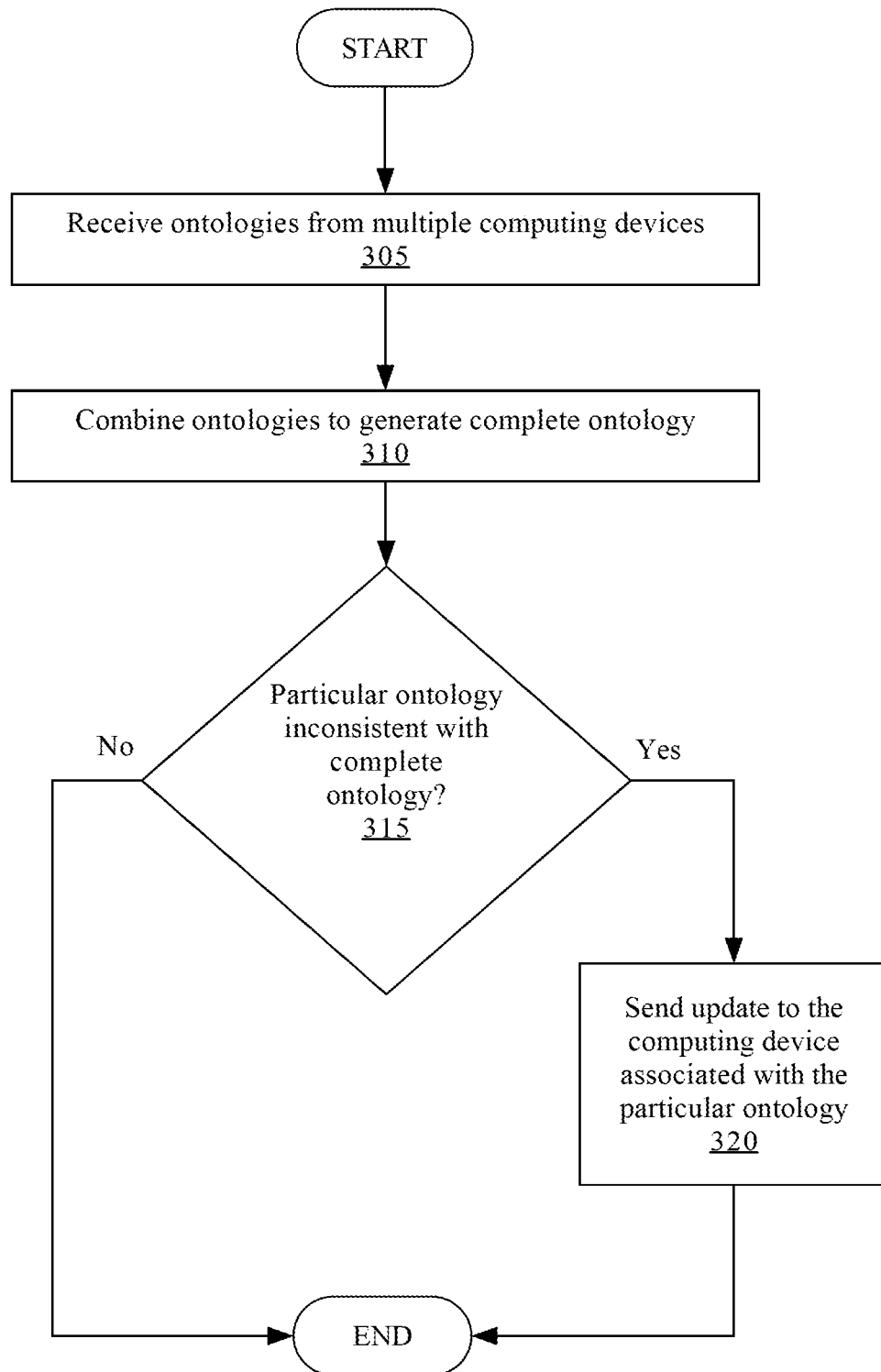
FIG. 3 illustrates a second example algorithm for a computer-implemented method of automatically generating an ontology for endpoints of a network, in one embodiment.

FIG. 3 illustrates an algorithm for a computer-implemented method of automatically generating an ontology for endpoints of a network, in one embodiment. Specifically, FIG. 3 shows an example flowchart for receiving and combining ontologies. Although the steps in FIG. 3 are shown in an order, the steps of FIG. 3 may be performed in any order, and are not limited to the order shown in FIG. 3. Additionally, some steps may be optional, may be performed multiple times, and/or may be performed by different components.

In step 305, ontologies are received from multiple computing devices. The ontologies may be received in any format and at any time. Each ontology was generated at the edge of the network by a computing device, and therefore represents a small portion of the network or domain. In contrast, a server is receiving the ontologies and the server is not located at the edge of the network. Additionally, other information besides ontologies may also be received at step 305, such as the probabilistic hierarchies or any other data.

In step 310, the ontologies are combined to generate a complete ontology for the network or domain. The ontologies may be combined in any manner. In one embodiment, the complete ontology represents a joint similarity metric of the partial ontologies and/or other data received in step 305. The joint similarity metric may be provided using a Bhattacharyya kernel class, or any other measure of distance/similarity. A Bhattacharyya kernel class is a class of product kernels that permit the fusion of generative and discriminative estimation to exploit their complementary contribution, resulting in the complete ontology representing a best trade-off among the partial ontologies used to generate the complete ontology.

In step 315, a determination is made whether a particular ontology is inconsistent with the complete ontology. The determination may be made in any manner. For example, the inconsistency may be an inaccurate label for a certain type of endpoint, or other aspect that became clearer when the complete ontology was generated. If there are no inconsistencies, the method ends. If there are inconsistencies, then the method proceeds to step 320.

In step 320, an update is sent to the computing device associated with the particular ontology. The update may be sent in any manner and in any format. In response to receiving the update, the computing device associated with the particular ontology updates the particular ontology as instructed in the update.

5. Implementation Example

Figure 4:
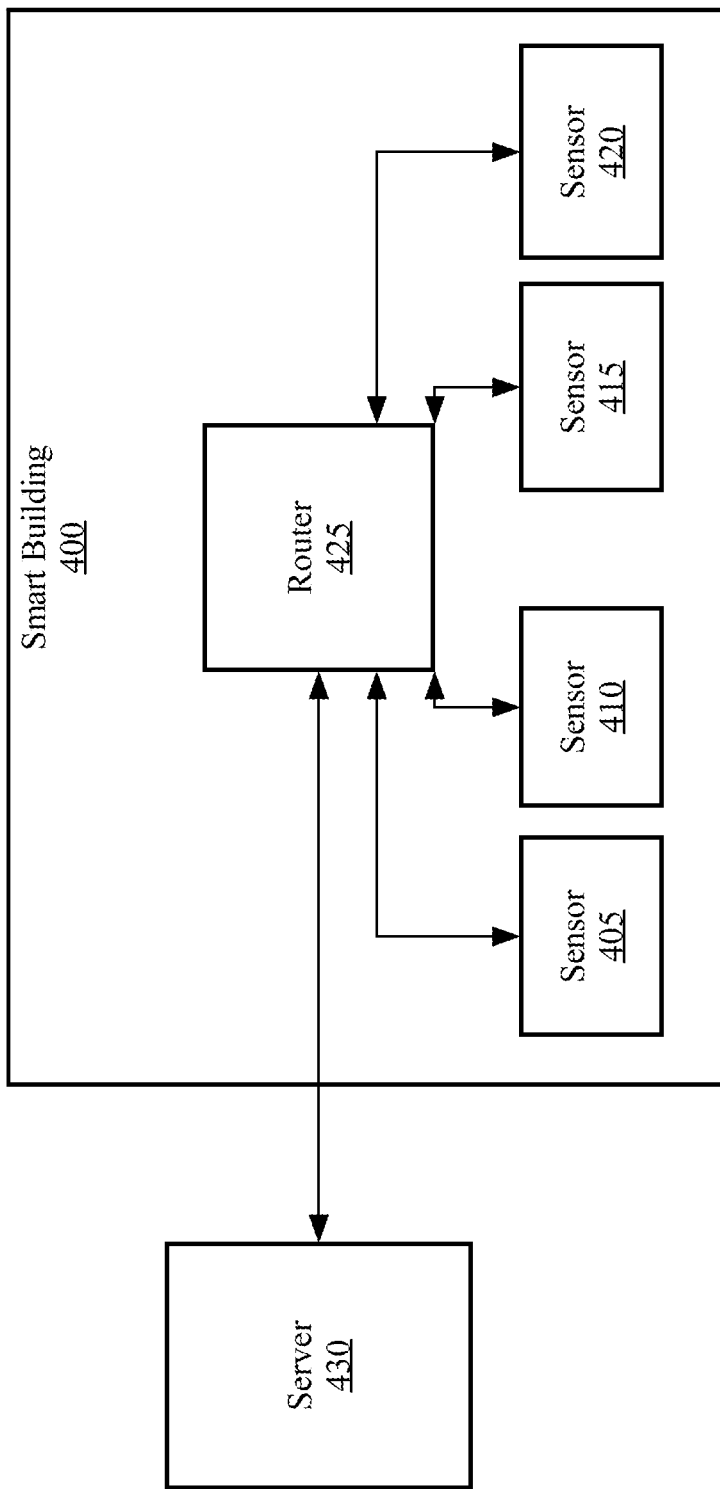
FIG. 4 is a simplified illustration of a smart building with embedded sensors, a router and a server computer, which may be used in one implementation.

FIG. 4 is a simplified illustration of a smart building with embedded sensors, a router and a server computer, which may be used in one implementation.

Turning to the example, FIG. 4 shows smart building 400 comprising a server computer 430 coupled to a router 425, which is coupled to a plurality of embedded sensors 405, 410, 415, 420. Assume that smart building 400 was recently purchased by a new owner, and the new owner does not know the details of all the connected sensors in smart building 400. Thus, the owner decides to use the present techniques to automatically generate an ontology for smart building 400.

For the purposes of this example, sensor 405 is a motion sensor in a shared video conferencing room, and sensor 410 is the video camera for the shared video conferencing room. Meanwhile, sensor 415 is a temperature sensor for Tim's office, and sensor 420 is a motion sensor in Tim's office.

Router 425 begins to monitor actual network traffic sent by sensors 405, 410, 415, and 420, and collects data about the traffic, such as metadata, packet header information, network-layer properties such as inter-packet arrival time, and packet size. Based on this collected data, router 425 generates a probabilistic hierarchy, and uses natural language data to generate a similarity metric for the probabilistic hierarchy and natural language elements. This results in generating an ontology for smart building 400. Router 425 sends this ontology to server 430 for combination with other ontologies related to smart building 400, which are not shown in this example for simplicity.

The sensors have now been labeled, based on the automatically generated ontology, with labels that are more meaningful to humans. Specifically, the ontology has labeled sensor 405 as conference room 1 motion sensor and sensor 410 has been labeled conference room 1 video camera. These labels were inferred from the traffic that these sensors generated. In particular, the data sent by the video camera and/or associated video conferencing applications, lead to the labeling of the room as a conference room. Also, the two sensors 405 and 410 have been fused into a single node, representing the conference room, based on their physical proximity and other data.

Likewise, the sensors in Tim's office have been labeled by the ontology as well. Sensor 415 has been labeled office A temperature sensor, and sensor 420 has been labeled office A motion sensor. A more specific label was not provided as the data sent by sensor 415 and 420 did not indicate who owned the office—additional data from other sources, such as Tim's computer, may be needed to identify the owner of the office.

As shown by this example, by combining actual data following through the network with multi-modal data from other sources (such as natural language data), a robust ontology may be generated that understands and accurately labels data in a way that is meaningful to humans. This overcomes common deficiencies in existing methods which commonly do not use multi-modal data, are not generated at the edge of a network, and/or are not based on actual data, among other deficiencies.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) or general-purpose graphic processing units (GP-GPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs, or GP-GPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
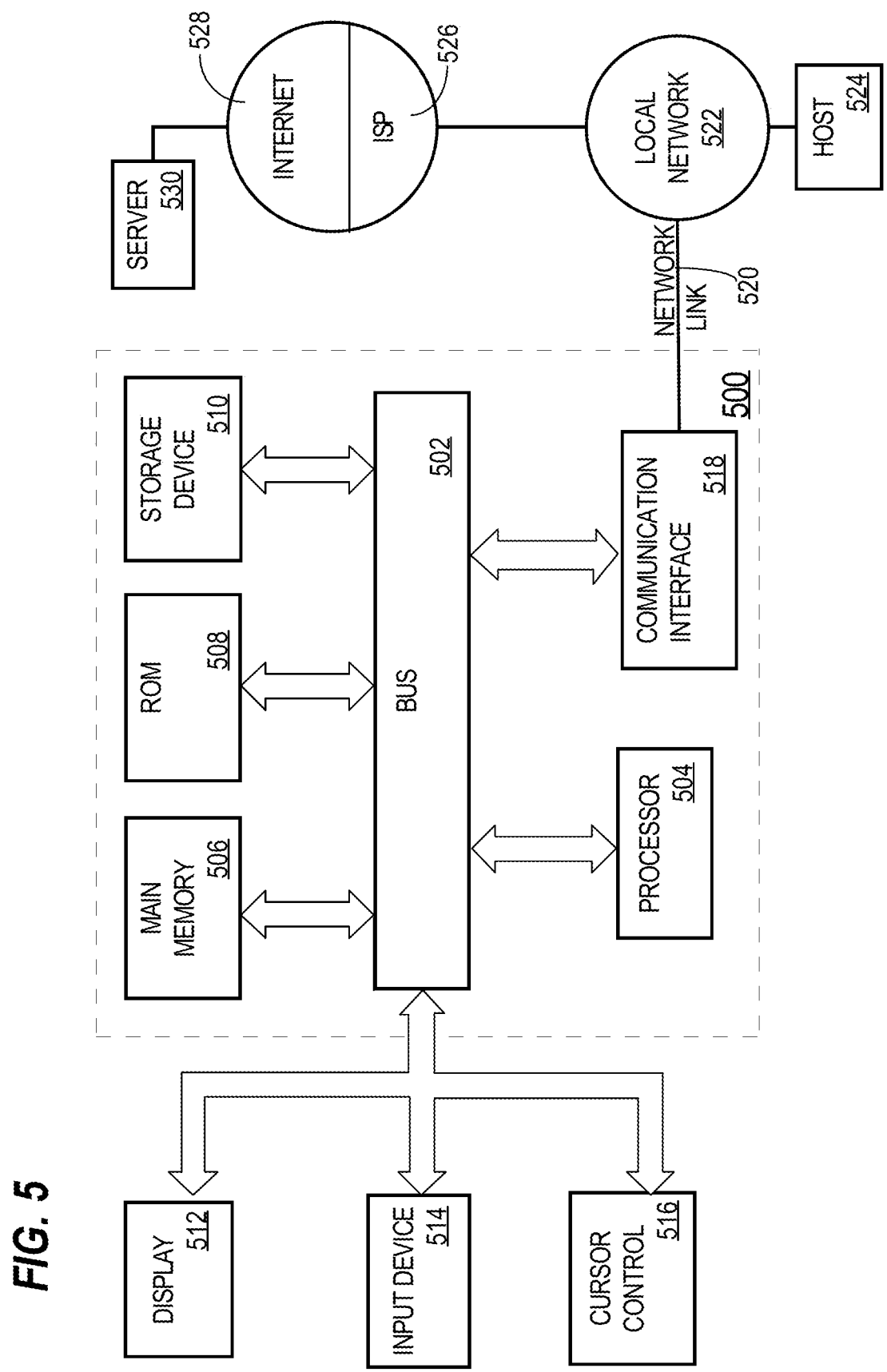
FIG. 5 illustrates an example computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs, or FPGAs, or GP-GPUs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
monitoring, by a computing device located at an edge of a network, network traffic generated by a plurality of endpoints using the network to collect a plurality of data items corresponding to the network traffic transmitted by the plurality of endpoints using the network;
generating, by the computing device, a probabilistic hierarchy using the plurality of data items corresponding to the network traffic;

generating, by the computing device using the probabilistic hierarchy and natural language data, a similarity metric;
generating, by the computing device using the probabilistic hierarchy, the natural language data, and the similarity metric, a network ontology for the plurality of endpoints;
detecting, by the computing device using the network ontology for the plurality of endpoints, a network anomaly;
in response to detecting the network anomaly, sending a notification;
generating, by the computing device, simulated output for an endpoint of the plurality of endpoints;
comparing, by the computing device, the simulated output to an actual output received from the endpoint of the plurality of endpoints using a confidence metric; and
updating the network ontology in response to the confidence metric exceeding an error threshold.

2. The method of claim 1, further comprising: sending, by the computing device, the network ontology to a server, wherein the server combines the network ontology with a plurality of other network ontologies received from other computing devices within the network, to generate a complete network ontology for the network.

3. The method of claim 2, wherein the network ontology is compressed prior to sending the network ontology to the server.

4. The method of claim 1, wherein the computing device is a network infrastructure device.

5. The method of claim 1, wherein the network comprises a smart building.

6. The method of claim 1, wherein the plurality of endpoints comprises one or more of: a motion detector, a video conferencing system, a computer, a microphone, a telephone, a temperature sensor.

7. The method of claim 1, wherein the plurality of data items comprises one or more of: metadata, a packet header, a packet size, or an inter-packet arrival time.

8. The method of claim 1, wherein the natural language data is WordNet.

9. The method of claim 1, wherein the network traffic transmitted by the plurality of endpoints using the network is encrypted.

10. A system comprising:
one or more computing devices located at an edge of a network, each computing device comprising a first processor and a first electronic digital memory storing one or more sequences of instructions which, when executed, cause the first processor to perform:
monitoring network traffic generated by a plurality of endpoints using the network to collect a plurality of data items corresponding to the network traffic transmitted by the plurality of endpoints using the network;
generating a probabilistic hierarchy using the plurality of data items corresponding to the network traffic;
generating, using the probabilistic hierarchy and natural language data, a similarity metric;
generating, using the probabilistic hierarchy, the natural language data, and the similarity metric, a network ontology for the plurality of endpoints;
sending the network ontology to a server;
generating, by the computing device, simulated output for an endpoint of the plurality of endpoints;
comparing, by the computing device, the simulated output to an actual output received from the endpoint of the plurality of endpoints using a confidence metric; and
updating the network ontology in response to the confidence metric exceeding an error threshold;
a server comprising a second processor and a second electronic digital memory storing one or more sequences of instructions which, when executed, cause the second processor to perform:
receiving a plurality of network ontologies each generated by the one or more computing devices;
combining the plurality of network ontologies to generate a complete ontology for the network;
determining that a particular network ontology of the plurality of network ontologies is inconsistent with the complete network ontology;
sending an update to the particular network ontology to the computing device associated with the particular network ontology.

11. The system of claim 10, wherein the network ontology is compressed prior to sending the network ontology to the server.

12. The system of claim 10, wherein the one or more computing devices are network infrastructure devices.

13. The system of claim 10, wherein the network comprises a smart building.

14. The system of claim 10, wherein the plurality of endpoints comprises one or more of: a motion detector, a video conferencing system, a computer, a microphone, a telephone, a temperature sensor.

15. The system of claim 10, wherein the plurality of data items comprises one or more of: metadata, a packet header, a packet size, or an inter-packet arrival time.

16. The system of claim 10, wherein the natural language data is WordNet.

17. An apparatus comprising:
a processor; and
a memory storing one or more sequences of instructions which, when executed, cause the processor to perform:
monitoring network traffic generated by a plurality of endpoints using the network to collect a plurality of data items corresponding to the network traffic transmitted by the plurality of endpoints using the network;
generating a probabilistic hierarchy using the plurality of data items corresponding to the network traffic;
generating, using the probabilistic hierarchy and natural language data, a similarity metric;
generating, using the probabilistic hierarchy, the natural language data, and the similarity metric, a network ontology for the plurality of endpoints;
sending the network ontology to a server;
generating simulated output for an endpoint of the plurality of endpoints;
comparing the simulated output to an actual output received from the endpoint of the plurality of endpoints using a confidence metric; and
updating the network ontology in response to the confidence metric exceeding an error threshold.

18. The apparatus of claim 17, wherein when executed, the memory further causes the processor to perform:
sending, by the computing device, the network ontology to a server;
wherein the server combines the network ontology with a plurality of other network ontologies received from other computing devices within the network, to generate a complete network ontology for the network.

19. The apparatus of claim 18, wherein the network ontology is compressed prior to sending the network ontology to the server.

20. The apparatus of claim 17, wherein the apparatus is a network infrastructure device.

\* \* \* \* \*